Nov. 6, 1962   J. C. CLARK   3,062,474
SPIN CAST FISHING REEL

Filed Aug. 4, 1960   2 Sheets-Sheet 1

INVENTOR.
JOSEPH C. CLARK
BY
Lloyd Johnson

Nov. 6, 1962  J. C. CLARK  3,062,474
SPIN CAST FISHING REEL
Filed Aug. 4, 1960  2 Sheets-Sheet 2

INVENTOR.
JOSEPH C. CLARK
BY

United States Patent Office 3,062,474
Patented Nov. 6, 1962

3,062,474
SPIN CAST FISHING REEL
Joseph C. Clark, 4843 Backacher Lane, Orlando, Fla.
Filed Aug. 4, 1960, Ser. No. 47,552
5 Claims. (Cl. 242—84.2)

This invention relates in general to spin-cast fishing reels and more particularly to an automatic mechanism for operating a winding means.

Prior to this invention spin-cast reels included winding means utilizing complicated automatic cam mechanisms which were unreliable, complicated and expensive to manufacture, or were of the manual type which required manual setting.

The present invention overcomes the above objections and disadvantages by the provision of a relatively simple winding means responsive to the operation of the reel crank and includes means for projecting a winding dog into active position for winding and unwinding the line from a fixed spool.

Another object of the invention is the provision of a winding drum having a lever means thereon including a friction wheel responsive to the rotation of the drum including lever means for projecting a winding dog from the periphery of the drum.

A further object of the invention is the provision of a fixed crown type pulley for raising and holding a friction pulley for projecting and holding a winding dog in operating position when the winding crank is operated, including thumb lever means for retracting the dog.

These and other objects and advantages in one embodiment of the invention are described and shown in the following specifications and drawings in which.

Figures 1, 2:
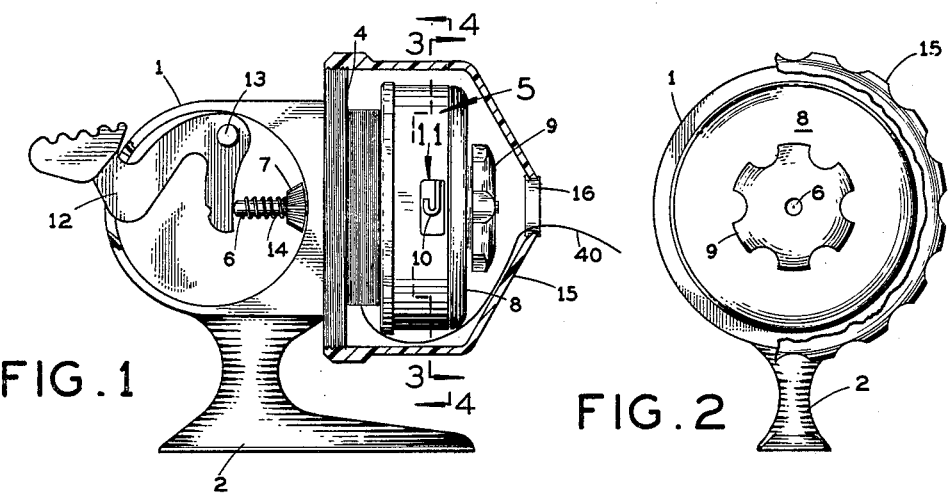
FIG. 1 is a side elevation of the reel with a portion thereof in cross section and the crank means removed.
FIG. 2 is a front elevation of the reel shown in FIG. 1, with certain portions of the housing being removed.

Referring to FIG. 1, the principal components of the reel include a housing 1 including an integral foot member 2 adapted to be secured to a rod in conventional manner. A fixed spool 3 has flanges 4—4 which are integral with body 1. Winding drum assembly 5 is supported coaxially with spool 3 and adapted for rotation and reciprocation by drive shaft 6 and adapted to be rotated by a pinion 7 which in turn is driven by a manual crank-drive gear means not shown.

A wear disc 8 is keyed to shaft 6 and is retained thereon by an adjustable finger nut 9 threaded on the outer end of shaft 6. A winding dog 10 is positioned for movement from a retracted position in the drum to a projected position through an aperture 11 for engaging the line.

A thumb lever 12 is pivoted on a boss 13 integral with housing 1 and lever 12 is adapted to engage and move shaft 6 in an axial direction against the restraining action of spring 14. A drum housing 15 is threaded on housing 1 concentric with and over the drum assembly and the conical portion thereof terminates in line guide 16.

Figures 3, 4:
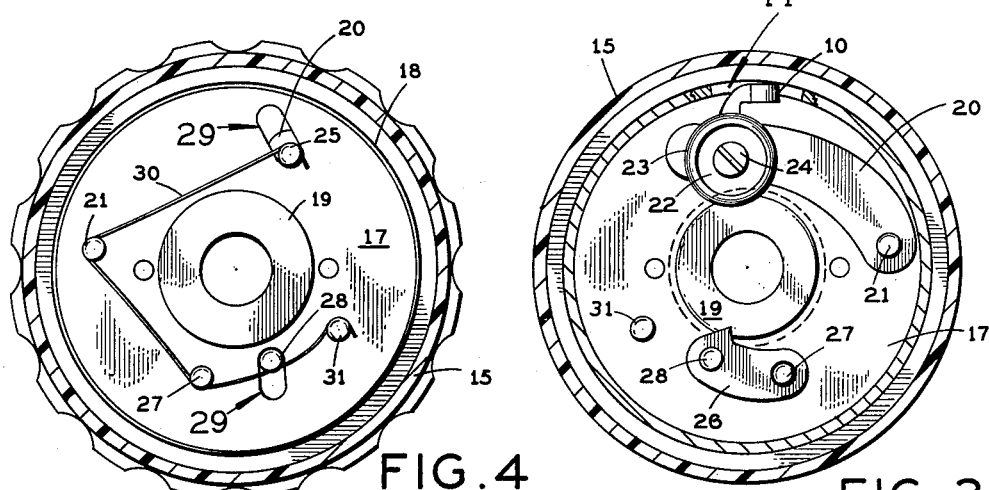
FIG. 3 is a cross sectional view taken through section line 3—3, FIG. 1.
FIG. 4 is a cross sectional view taken through section line 4—4, FIG. 1.
Figures 5, 6:
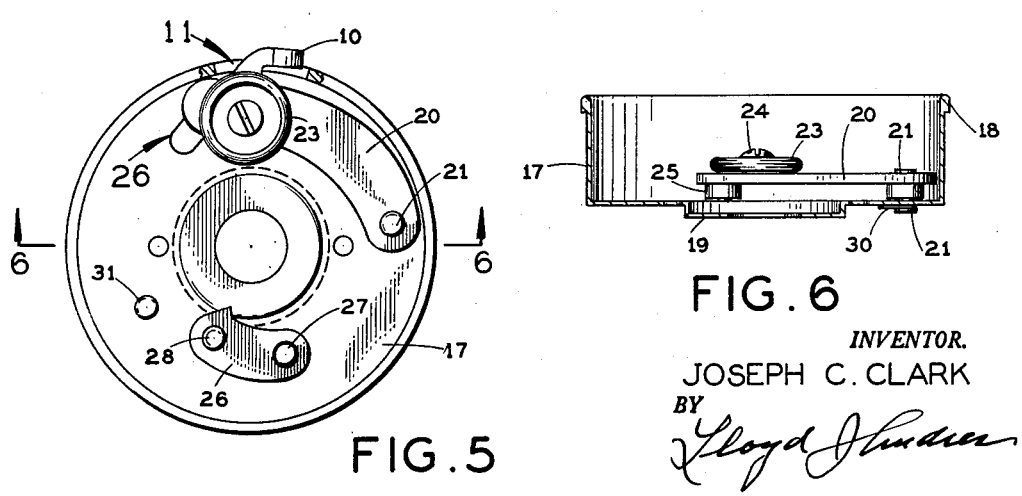
FIG. 5 is the same as FIG. 3 with the elements in changed position.
FIG. 6 is a cross sectional view taken through section line 6—6, FIG. 5.

Referring to FIGS. 3 and 6, winding drum assembly 5 consists of a circular cup 17 having a radiused wear flange 18 about the edge thereof and a central planar offset portion 19 in the end wall thereof.

Referring to FIG. 3, a lever 20 has a stud 21 secured at one end thereof, said stud pivoting on the end wall of drum 17, and lever 20 further includes an integral U-shaped line dog 10 extending therefrom. A friction wheel 22 having a resilient O-ring tire 23 is journalled for rotation on lever 20 by shoulder screw 24 as shown. A stud 25 is secured in the outer end of lever 20 and projects through an aperture 29 in the drum as shown in FIG. 4. A click member 26 has a stud 27 secured in one end thereof and is also pivoted in drum 17. A stud 28 secured in click 26 projects through another clearance aperture 29 in the drum shown in FIG. 4.

A spring 30 shown in FIG. 4 is secured at one end thereof in a grooved stud 31 which is mounted on drum 17 and is further secured in grooves on the inner ends of studs 21, 25, 27 and 28, thus retaining the lever 20 and the click 26 in their operating positions as shown, with the spring tensioned for normally urging the studs 25 and 28 toward the center of the drum. FIG. 5 illustrates the lever 20 moved against the restraining action of spring 30 into its active position with the dog 10 projecting from the periphery of the drum.

Figure 7:
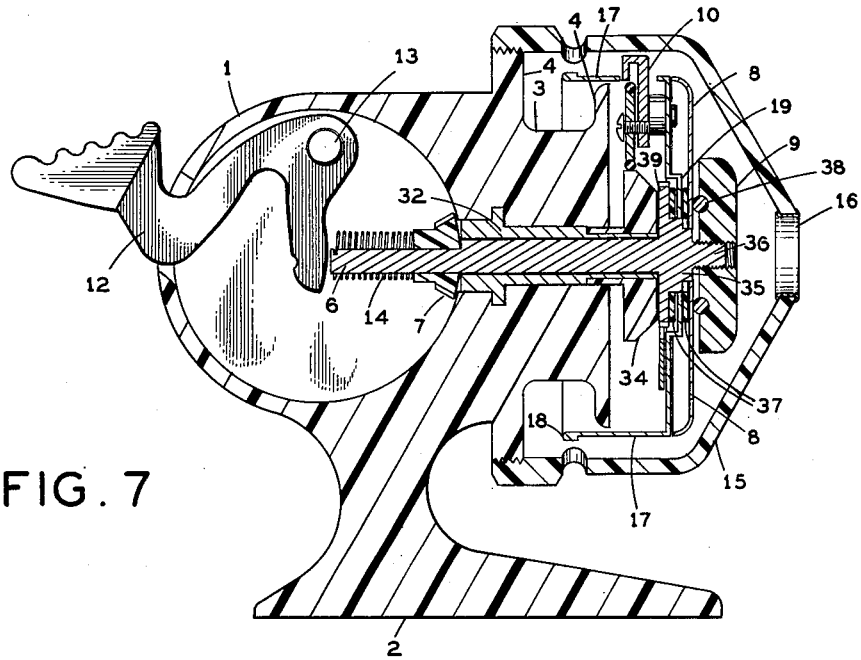
FIG. 7 is an enlarged cross sectional elevation of the reel shown in FIG. 1.

Referring to FIG. 7, pinion 7 is slidably keyed to a flat on shaft 6 which is journalled in a fixed bearing 32 in a bore in the housing. Shaft 6 is retained in bearing 32 for rotation and reciprocation. A fixed wheel 34 having a conical edge is secured in housing 1 concentric with bearing 32 in the same bore, as shown, A hub 35 integral with shaft 6 terminates at its outer end in a threaded portion 36 for supporting the drum 17 between a pair of friction washers 37—37, as shown. The wear disc 8 is loosely and coaxially keyed on a squared portion of hub 35. A circular resilient ring 38 or O-ring is retained in a groove in finger wheel 9 which is threaded on portion 36 of shaft 6. Thus the wear disc 8 is urged against the outer friction washer 37 and frictionally secures drum 17 against rotation on the hub 35.

The shaft 6 is normally urged into the position shown in FIG. 7 by compression spring 14 which is secured at the outer end thereof and tensioned against the pinion 7. In this position the dog 10 is projecting from the drum 17 for winding or unwinding a line from the spool 3. The flange 39 of hub 35 has peripheral equi-spaced teeth in engagement with click 26.

Figure 8:
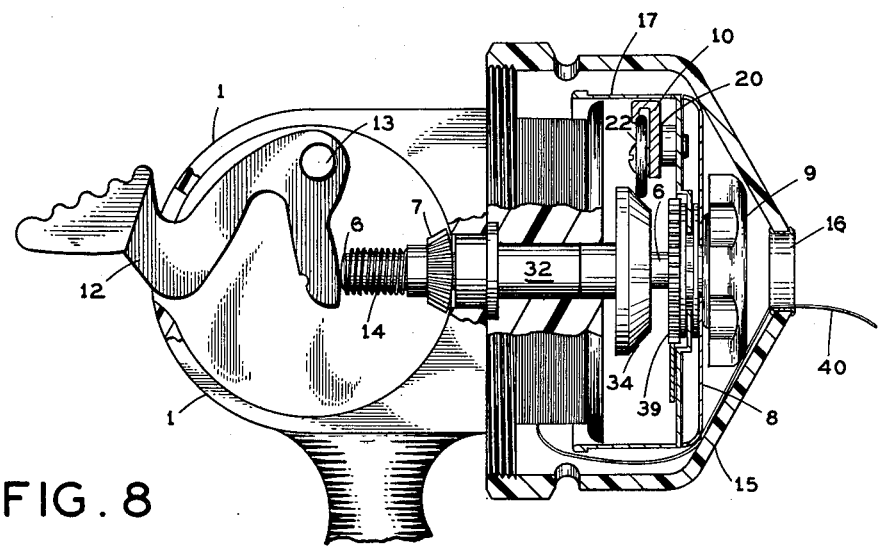
FIG. 8 is a view similar to that of FIG. 7, with certain of the parts being shown in section in FIG. 7 being shown in elevation and certain elements in changed position.

The thumb lever 12 extends through an appropriate aperture at the rear of the housing and when depressed will engage and move the shaft 6 and the drum assembly 5 forward from the position shown FIG. 7 to the position shown in FIG. 8.

In describing the operation it will be assumed that the reel includes a conventional crank and gear member which meshes with pinion 7 and that line 40 is wound on spool 3 with appropriate bait attached. Prior to casting, the thumb lever is fully depressed thus gripping the line 40 between the wear plate 8 and the oblique inside surface of housing 15, and at an appropriate time during the cast, the thumb lever is released and the line will freely unwind in helical manner around the drum and through guide 16.

It is to be noted that the dog 10 is now retracted into the drum by virtue of the wheel 22 resting on a small diameter portion of wheel 34.

To limit the range of the cast, the thumb lever is again depressed and the line braked and stopped by virtue of the gripping action of the line between wear plate 8 and housing 15.

To retrieve the line, the pinion 7 and the wheel 34 are rotated by the crank which will rotate the wheel 22 around wheel 34, and impart a climbing action to wheel 22 causing the same to rise to the outer edge of wheel 34 against the restraining action of spring 30 and project dog 10 from the periphery of the drum. Continued rotation of the crank will engage the dog with the line 40 and helically wind the same on spool 3. The climbing action of wheel 22 on the conical surface of wheel 34 is caused by spring 14 which forces shaft 6, and drum 17 carried thereby, rearwardly, or to the left as viewed in FIG. 8, thereby correspondingly moving the lever 20 and wheel 22 rearwardly.

It is to be noted that because of the location of the edge 18 of the drum directly above the spool, the line in its natural helical wind on the hub of the spool will generally wind the line on the spool hub in substantially level manner.

In the event of a strike or a snag, and under restraint of the crank, the line will withdraw and because of its engagement with the dog will counter rotate the drum under the drag of the friction afforded by the discs 37—37 dependent upon the adjustment of finger wheel 9.

Concurrent with the above counter rotation, the click will emit audible warning sound.

It is further to be noted that the entire reel may be disassembled by removing the housing 15 and disengaging spring 14 from the end of shaft 6 and first removing the drum assembly. The drum may be completely disassembled by removing finger wheel 9, wear plate 8, and disengaging spring 30 from the studs shown in FIG. 4.

It is understood that certain modifications in the above construction utilizing the features described are intended to come within the scope of the appended claims.

Having described my invention, I claim:

1. A spin-cast fishing reel comprising a means forming a housing, a spool means fixed to said housing for retaining a line wound thereon, a shaft journalled in said housing for axial reciprocation and rotation positioned concentric with said spool, a drum having an open end secured on the outer end portion of said shaft for rotation and axial movement thereby, a first spring means biased between said housing and said shaft for urging said drum into a normal position, a lever means including a line dog thereon pivoted on said drum for oscillation normal to said shaft adapted and constructed to move said dog from a retracted position below to a projected position above the outer periphery of said drum for winding engagement with said line, a cone-wheel fixed to said housing adjacent the outer end of said spool and coaxial therewith, a friction wheel journalled on said lever means for rotation about an axis parallel the axis of said shaft and in frictional engagement with said cone-wheel for rotation and axial movement thereon, a thumb lever pivoted to said housing positioned and adapted to engage the inner end of said shaft and move same and said drum from said normal to an extended position when depressed, a cylindrical casing positioned over said drum and secured to said housing having an oblique inner surface equi-spaced from the outer edge of said drum when the latter is in said normal position, a line guide in the outer end of said casing coaxial with said drum for guiding said line to and from the latter, a second spring means biased between said drum and said lever means for urging said friction wheel into engagement with said cone-wheel, whereby said drum will move from said normal to said extended position and permit the free unwinding of said line from said spool and withdrawal around said drum and through said guide when said thumb lever is depressed and whereby the release of said thumb lever and the rotation of said drum will concurrently permit said drum to move to said normal position and said dog to move to said projected position and wind said line on said spool.

2. In a spin-cast fishing reel a means forming a housing, a spool means fixed to said housing for retaining a line wound thereon, a shaft journalled in said housing for axial reciprocation and rotation positioned concentric with said spool, a drum having an open end secured on the outer end portion of said shaft for coaxial rotation and axial movement thereby to and from normal and extended positions for guiding said line over the outer periphery thereof with the edge of said open end positioned to guide said line to and from said spool, a first spring means biased between said housing and said shaft for urging said drum into said normal position, a lever means including a line dog thereon pivoted on said drum for oscillation normal to said shaft adapted and constructed to move said dog from a retracted position below to a projected position above the outer periphery of said drum for winding engagement with said line, a cone-wheel fixed to said housing adjacent the outer end of said spool and coaxial therewith, a friction wheel journalled on said lever means for rotation about an axis parallel to the axis of said shaft and in frictional engagement with said cone-wheel for rotation and axial movement thereon, a second spring means biased between said drum and said lever means for urging said friction wheel into engagement with said cone-wheel whereby said friction wheel will rise from a position on a small diameter of said cone-wheel to the outer periphery thereof and move and hold said dog into said projected position and into engagement with said line guided by said drum and wind same on said spool when said drum is rotated and moved from said extended position to said normal position by said first spring means.

3. In a spin-cast reel of the character described means forming a housing and a fixed spool for retaining a line, a shaft journalled for rotation and axial movement in said housing, a drum frictionally secured to one end of said shaft for rotation therewith for guiding said line to and from said spool, said drum adapted to rotate on said shaft when predetermined opposite torque is applied to said drum, a dog means movably retained on said drum and having a portion thereof adapted for movement from below to a predetermined position above the periphery of said drum when operated, a cone-wheel fixed to said housing coaxial with said drum, a friction wheel journalled on said dog means for rotation about an axis parallel to the axis of said drum and in frictional engagement with said cone-wheel for rotation and axial movement thereon, a first spring means positioned between said housing and said shaft for urging said shaft to a normal, retracted position, a hub having equispaced teeth thereon secured on said shaft, a click pawl pivoted on said drum for engagement with said teeth when said drum is rotated, a spring means secured on said drum and engaged with said dog means and said pawl for urging said friction wheel into engagement with said cone-wheel and for independently urging said pawl into engagement with said teeth respectively, whereby said friction wheel will rise from a position on a small diameter of said cone-wheel to a position on the outer periphery thereof and move and hold said portion of said dog means above the periphery of said drum when the latter is rotated and axially moved a predetermined distance from a normal to an extended position for engaging and winding said line on said spool and whereby the withdrawal of said line from said reel will counter rotate said drum and unwind said line from said spool and operate said click pawl when said drum is in said normal position.

4. In a spin-cast reel of the character described means forming a housing and a fixed spool for retaining a line, a shaft journalled for rotation and axial movement in said housing, a drum mounted on said shaft and rotatable and axially movable therewith for guiding a line to and from said spool, spring means associated with said shaft for biasing said drum toward said fixed spool, a dog means movably retained on said drum and having a portion thereof adapted for movement from below to a predetermined position above the periphery of said drum when operated, a cone-wheel fixed to said housing coaxial with said drum, a friction wheel journalled on said dog means for rotation about an axis parallel the axis of said drum and in frictional engagement with said cone-wheel for rotation and axial movement thereon, resilient means for biasing said friction wheel into frictional engagement with said cone wheel whereby said friction wheel, under the bias of said spring means, will rise from a position on a small diameter of said cone-wheel to a position on the outer periphery thereof and move and hold said portion of said dog means above the periphery of said drum when the latter is rotated and axially moved a predetermined distance from a normal to an extended position for engaging and winding said line on said spool.

5. In a spin-cast reel of the character described, a housing, a shaft journalled for rotation and axial movement in said housing, a drum mounted on said shaft and rotatable and axially movable therewith for guiding a line on to a fixed spool, spring means associated with said shaft for biasing said drum toward said fixed spool, a dog means movably retained on said drum and having a portion thereof adapted for movement from a position below to a projected position above the periphery of said drum when operated for engaging and winding said line on said spool, a cone-wheel fixed to said reel and positioned coaxial with said drum, a friction wheel journalled on said dog means for rotation about an axis parallel to the axis of said drum and in frictional engagement with said cone-wheel for rotation and axial movement thereon, resilient means for biasing said friction wheel into frictional engagement with said cone wheel whereby said friction wheel under the bias of said spring means will rise from a position on a small diameter of said cone-wheel to a position on a larger diameter of said cone-wheel for moving said dog means to said projected position when said drum is rotated.

References Cited in the file of this patent

UNITED STATES PATENTS

| 2,613,882 | Small | Oct. 14, 1952 |
| 2,711,292 | Taggart et al. | June 21, 1955 |

FOREIGN PATENTS

| 820,874 | Great Britain | Sept. 30, 1959 |
| 1,215,596 | France | Nov. 23, 1959 |